Aug. 9, 1938.                C. E. REED                2,126,037
                            REAMER CUTTER
                         Filed Dec. 2, 1936
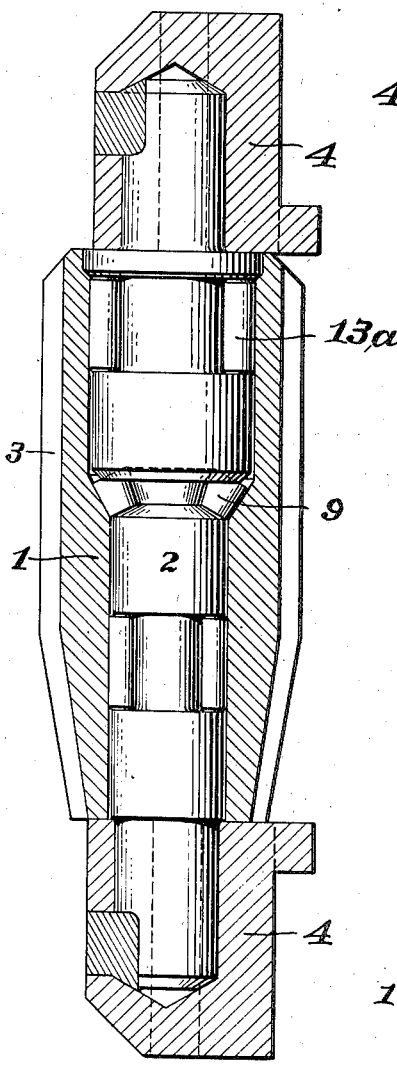
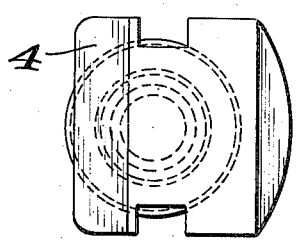
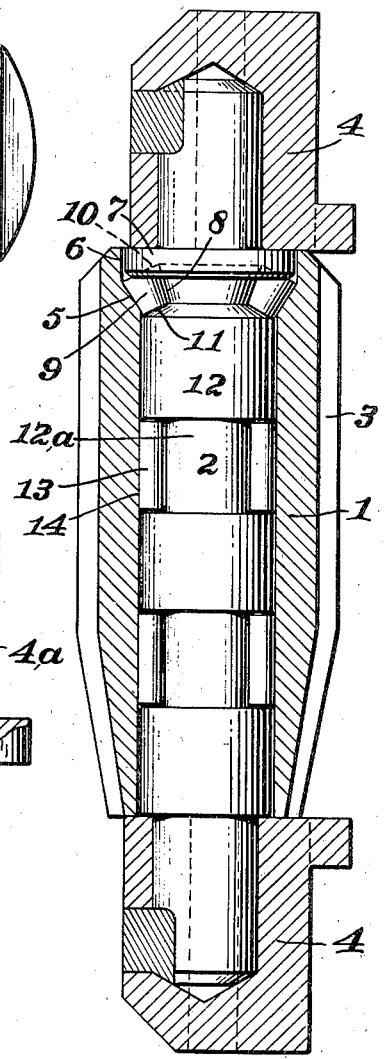
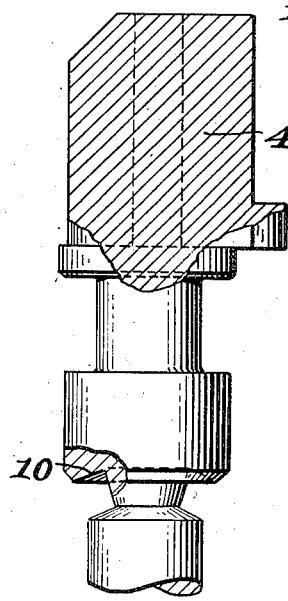
Inventor:
Clarence E. Reed,
By Spear, Donaldson & Hall
Attorneys.

Patented Aug. 9, 1938

2,126,037

UNITED STATES PATENT OFFICE 2,126,037

REAMER CUTTER

Clarence E. Reed, Wichita, Kans., assignor to Chicago Pneumatic Tool Company, New York, N. Y., a corporation of New Jersey Application December 2, 1936, Serial No. 113,905

15 Claims. (Cl. 255—73)

The invention concerns a reamer cutter organization for enlarging earth bored wells of the type employing rotary toothed cutters. One object of the invention is to provide an anti-friction roller bearing assembly for such reamer organization, said bearings providing throughout the assembly line contacts with the spindle and with the roller reamer cutter to take loads radial to the vertical axis of the assembly, said roller bearings including cylindrical rollers between the cutter and spindle axially parallel with the axis of the spindle and cutter, and frusto-conical rollers taking upward end thrust of the cutter as well as radial loads, and imposing the same upon a frusto-conical raceway on the spindle, thereby relieving the cylindrical roller bearings of end thrust upwardly which otherwise would be imposed on an annular shoulder or flange of the spindle to the detriment of the performance of the cylindrical rollers as true rolling anti-friction means. A further object is to provide an anti-friction roller bearing assembly which will permit the use of a rotary toothed cutter of rugged construction, free from grooves in its bore, thus leaving substantial body portions of the metal to sustain the loads imposed on the cutter during its cutting action.

In the accompanying drawing—

Figure 1 is a vertical central section of a rotary reamer cutter and associated parts, with the spindle and roller bearings in side elevation.

Fig. 2 is a plan view of one of the blocks in which the end of the spindle is supported.

Fig. 3 is a view of a modification.

Fig. 4 shows another modification.

In the drawing a rotary reamer cutter is shown at 1. This is adapted to rotate about a spindle 2, the axis of which is vertically disposed. It is provided with cutting teeth 3, and for the most part it has a plain cylindrical bore. It is seated at its upper and lower ends in blocks 4 which are suitably held in the bit head. The reamer cutter is of rugged form having a body of substantial bulk. It is intended to enlarge the hole previously cut by a drilling tool, as is well known. The cutter at its upper end has a flared and cylindrical enlargement of its bore, the flared portion providing a frusto-conical surface 5 furnishing a raceway tapering downwardly, and above this raceway the enlarged bore is substantially cylindrical as at 6. The spindle is provided near its upper end with an enlargement or flange 7 of a diameter to lie with clearance within the enlarged cylindrical bore of the cutter and below this flange there is a frusto-conical surface 8 providing a raceway complemental to the frusto-conical raceway of the cutter.

Frusto-conical anti-friction bearing rollers 9 are arranged between these complementary raceways with their larger diameter end faces engaging a surface 10 formed by undercutting the flange 7 at an inclination.

The lower end faces of the frusto-conical roller bearings engage the inclined upper face 11 of an annular flange 12 on the spindle. Below this spindle flange 12 there is a cylindrical surface 12a forming a raceway for cylindrical anti-friction bearing rollers 13 which find a complementary cylindrical raceway 14 in the plain bore of the roller cutter. Other annular flanges may be provided on the spindle, one of which will define the lower end of the raceway 12a and another or other cylindrical anti-friction bearing rollers may be arranged in a manner similar to the above at a lower zone or zones of the spindle. The lower end of the spindle is seated in the lower block which in turn is seated in the bit head, for instance, by grooves in its sides of the block engaging ribs or projections on the bit head. The roller reaming cutter may be formed in sections divided from each other horizontally, each section having at least one of the cylindrical roller bearings associated therewith. These cylindrical roller bearings take loads imposed on the rotary toothed cutter radially in respect to the axis of the spindle. The end thrust of the reamer cutter upwardly will be taken by the frusto-conical roller bearings and this end thrust will be imposed on the spindle through the frusto-conical raceway thereof, and the overlying flange or shoulder of the spindle.

Furthermore these frusto-conical rollers by taking the end thrust upwardly of the reamer cutter relieve the cylindrical anti-friction roller bearings of upthrust from the cutter, which otherwise would be exerted upon and upwardly along their peripheries. Thus the cylindrical rollers will not be forced with their upper end faces against the annular shoulder of the spindle, and the cylindrical roller bearing will roll freely without having tendency to drag at their upper ends by reason of strong frictional contact with the shoulder. A true rolling anti-friction roller bearing assembly in the reamer organization, therefore, will be provided throughout. Instead of using the blocks such as shown in Fig. 2, the spindle may have integrally connected bearing blocks at its ends as shown at 4a, Fig. 3.

In Fig. 4 I show a modification in which a set of cylindrical roller bearings 13a is employed at the upper end of reamer cutter at a zone above the horizontal plane in which the frusto-conical rollers are located to take radial loads at the extreme upper part of the reamer cutter.

I claim:

1. A reaming roller cutter assembly for enlarging earth bored wells comprising a toothed roller reamer cutter disposed with its axis vertical, a spindle, frusto-conical anti-friction roller bearings arranged with their smaller ends directed downwardly, complementary frusto-conical raceways in the bore of the roller reamer cutter and on the spindle, the small diameter lower faces of the frusto-conical rollers being shielded by the wall of the spindle against upthrust of the reamer cutter and cylindrical anti-friction roller bearings between cylindrical raceways in the bore of the cutter and on the spindle, said frusto-conical rollers taking radial loads and upthrust from the reamer cutter and relieving said cylindrical rollers of said upthrust.

2. A reamer cutter and anti-friction roller bearing assembly acording to claim 1 in which the frusto-conical bearing rollers are arranged in an enlargement of the bore of the cutter, the spindle having a flange undercut on its lower face against which undercut surface the larger diameter upper end faces of the frusto-conical rollers bear, substantially as described.

3. A reamer cutter and anti-friction roller bearing assembly according to claim 1 in which the cutter has a plain cylindrical bore and the spindle is annularly shouldered, thereby defining a cylindrical raceway for the cylindrical anti-friction rollers, substantially as described.

4. A reamer cutter and anti-friction roller bearing assembly for earth bored wells comprising a roller reamer cutter arranged with its axis substantially vertical, a spindle about which the reamer cutter turns, said reamer cutter having a bore flared at its upper part, providing a frusto-conical raceway, frusto-conical bearing rollers in said flared bore on said frusto-conical raceway, said spindle having a complementary frusto-conical raceway for said roller bearings defined by annular shoulders on said spindle, and cylindrical roller bearings between said reamer cutter and the spindle, located in a plane below that in which the frusto-conical roller bearings lie, said cylindrical roller bearings being housed in a groove of the spindle and thereby shielded from end thrust, substantially as described.

5. A reamer roller cutter assembly according to claim 1 in which the frusto-conical roller bearings are at the upper end of the cutter bearing with their larger diameter ends bearing upon a flange on the spindle, located within a diametrical enlargement of the bore of the cutter.

6. A reamer assembly according to claim 1 in which the cutter has its bore enlarged in diameter and of cylindrical form above the zone in which the frusto-conical roller bearings lie, and cylindrical anti-friction rollers bearing on the wall of said cylindrical enlargement and upon the spindle, said spindle having an annular flange upon which the upper end faces of the cylindrical rollers bear, said spindle having annular shoulders upon which the lower ends of cylindrical anti-friction rollers and the upper end faces of said frusto-conical rollers bear respectively, substantially as described.

7. A reamer roller cutter having a toothed exterior and a bore comprising a cylindrical and a frusto-conical bearing surface, each forming a raceway for roller bearings.

8. As an article of manufacture a bearing for an earth boring reamer cutter comprising an elongated body having raceway surfaces for rolling bearings positioned between flange like portions of the said body, said flange like portions serving as frictional bearing surfaces and a side of said flange like portions abutting the end of a roller bearing, said body having means at both its ends by which it may be supported on a substantially vertical axis.

9. In a bearing for a roller cutter of an earth boring reamer and in combination roller bearings positioned in a groove like raceway in the periphery of the bearing for contacting a roller cutter with their peripheries, smooth cylindrical bearing surfaces on said bearing, and means at both ends of the bearing for supporting it on a substantially vertical axis.

10. As an article of manufacture a bearing for an earth boring reamer cutter comprising an elongated body having a roller bearing raceway surface concentric with the axis of the said body, another raceway surface the projection of which intersects the axis of said body, and a smooth frictional bearing surface for contacting the bore of a roller cutter.

11. In an earth boring drill, a reamer cutter adapted to be supported for rotation about a vertical axis, said cutter having an upper and a lower bore extending inwardly from the respective ends of the cutter, said bores being of different diameters, said cutter having an intermediate bore connecting the upper and lower bores, said intermediate bore being of frusto-conical shape.

12. A reamer cutter according to claim 11 in which the upper bore is of larger diameter than the lower bore and the intermediate bore tapers downwardly.

13. A reamer cutter according to claim 11 in which the upper and lower bores are of cylindrical shape and the intermediate bore is tapered uniformly from the upper bore to the lower bore.

14. In an earth boring drill, a spindle adapted to be supported on a vertical axis, said spindle having two cylindrical portions of different diameters, and having a frusto-conical portion between said cylindrical portions, the adjacent ends of the cylindrical portions providing shoulders adapted to abut the ends of tapered roller bearings.

15. A spindle according to claim 14 in which the shoulder adjacent the larger end of the frusto-conical portion is undercut to receive the larger ends of the rollers.

CLARENCE E. REED.